(12) United States Patent
Nickel

(10) Patent No.: US 6,684,998 B2
(45) Date of Patent: Feb. 3, 2004

(54) CENTRIFUGAL CLUTCH

(75) Inventor: Hans Nickel, Cottenweiler (DE)

(73) Assignee: Andreas Stihl AG & Co. (DE)

( * ) Notice: Subject to any disclaimer, the term of this patent is extended or adjusted under 35 U.S.C. 154(b) by 0 days.

(21) Appl. No.: 10/114,370

(22) Filed: Apr. 2, 2002

(65) Prior Publication Data

US 2002/0148701 A1 Oct. 17, 2002

(30) Foreign Application Priority Data

Apr. 12, 2001 (DE) .......................................... 101 18 225

(51) Int. Cl.⁷ .............................................. F16D 43/18
(52) U.S. Cl. .................................. 192/105 BA; 192/76
(58) Field of Search ............................. 192/105 BA, 76

(56) References Cited

U.S. PATENT DOCUMENTS

| | | | | |
|---|---|---|---|---|
| 2,016,643 A | * | 10/1935 | Lowndes ............... | 192/105 BA |
| 2,564,826 A | * | 8/1951 | Yoder .................... | 192/105 BA |
| 2,886,154 A | * | 5/1959 | Conlee .................. | 192/105 BA |
| 3,477,555 A | * | 11/1969 | Hazzard ................ | 192/105 BA |
| 3,610,382 A | * | 10/1971 | Makinson ............. | 192/105 BA |
| 3,971,463 A | * | 7/1976 | Zindler .................. | 192/105 BA |
| 4,819,779 A | * | 4/1989 | Nickel et al. ......... | 192/105 BA |
| 5,560,465 A | | 10/1996 | Zindler | |
| 5,680,920 A | * | 10/1997 | Jansson et al. ....... | 192/105 BA |

* cited by examiner

Primary Examiner—Rodney H. Bonck
(74) Attorney, Agent, or Firm—R W Becker & Associates; R W Becker

(57) ABSTRACT

A centrifugal clutch is provided, especially for manually-guided, motor-driven implements such as chainsaws and the like. The clutch comprises centrifugal bodies, each of which is essentially comprised of a shoe that has the shape of a circular arc and has a support member. The shoes are held and guided by guides on a carrier member that is disposed on the drive side. On the output side, the clutch is essentially formed of a drum having a surface that axially and radially spans the centrifugal bodies. Disposed at each end of a centrifugal body is a projection and a complementary recess, which both extend approximately tangentially relative to the drum.

13 Claims, 3 Drawing Sheets

CENTRIFUGAL CLUTCH

BACKGROUND OF THE INVENTION

The present invention relates to a centrifugal clutch, especially for manually-guided, motor-driven implements such as chain saws and the like.

U.S. Pat. No. 5,560,465 discloses a centrifugal clutch having movably interconnected centrifugal bodies that are laterally interconnected by toothed arrangements. Each centrifugal body comprises a shoe having the shape of a circular arc and having a support member for connecting the centrifugal bodies in a radially displaceable manner on dogs of a hub. The hub is disposed on a drive side of the centrifugal clutch. The centrifugal bodies are axially and radially spanned by a drum, and under the effect of centrifugal force move against the surface of the drum in order to transfer torque.

At their lateral ends, the centrifugal bodies are provided with variously configured guide elements that inter-engage and to a large extent prevent tilting of the centrifugal bodies. Especially if the guide elements are formed from a parallel guidance in the form of a spring and tongue guidance, a mutual jamming and sudden release of the centrifugal bodies with a corresponding jerky transfer of torque to the clutch drum results. In addition, after a certain period of operation, wear of the radial guidance between the support member of the centrifugal bodies and the dogs of the hub occurs, so that the centrifugal bodies tilt on the dogs. In this connection, especially during idling, the centrifugal bodies strike against the drum and cause bell-like noises.

It is therefore an object of the present invention to provided a low-noise centrifugal clutch that ensures a uniform transfer of torque and has a simple construction and assembly.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
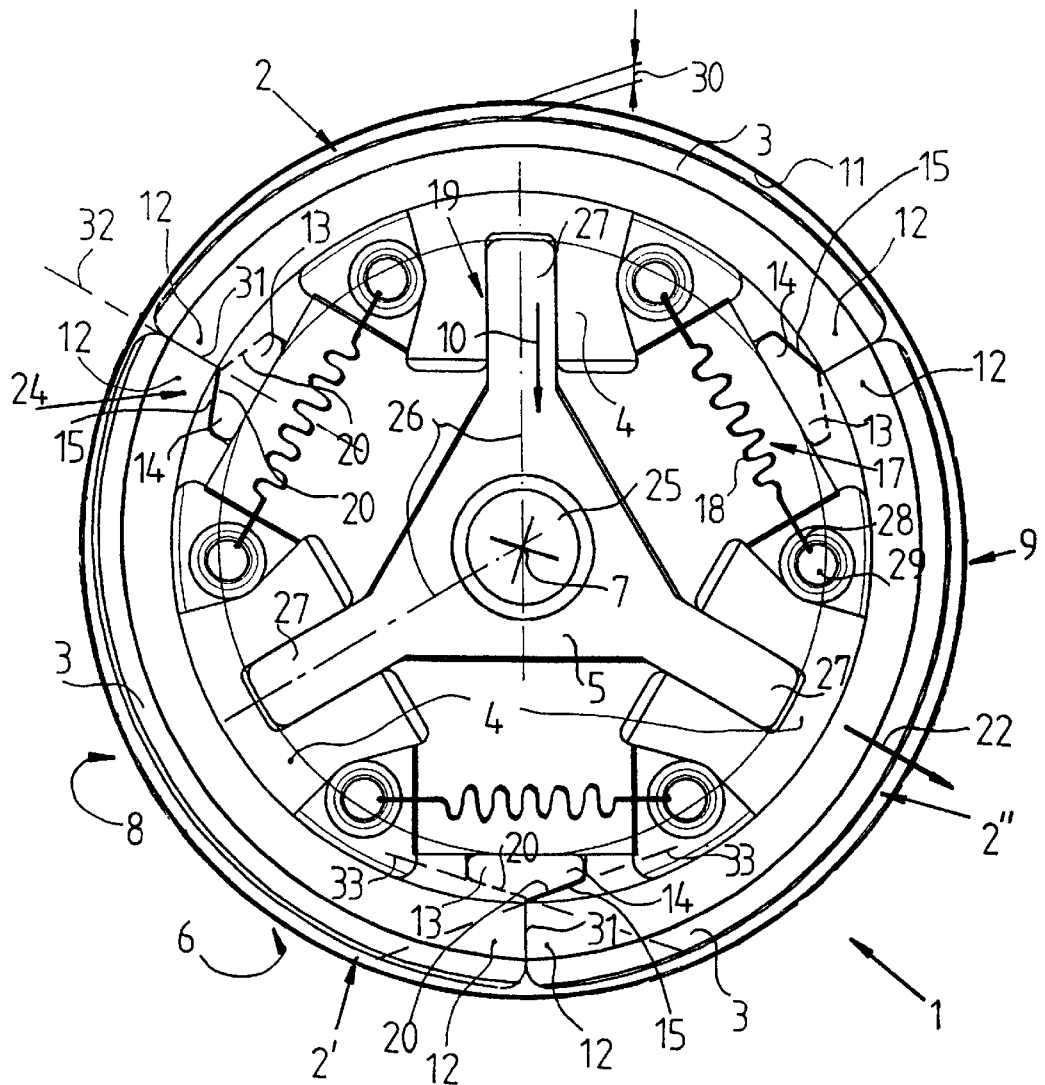
FIG. 1 is a schematic plan view of one exemplary embodiment of an inventive centrifugal clutch.

The centrifugal clutch of the present invention comprises centrifugal bodies, each of which is a shoe that has the shape of a circular arc and on a drive side of the clutch, is movably held on a carrier member via a support member; the clutch also has a drum disposed on the output side thereof coaxial to the axis of rotation of the carrier member, wherein the drum spans the shoes and wherein during operation of the clutch, under the effect of centrifugal force, the shoes are adapted to engage against a surface of the drum counter to a restoring force; finally, the clutch has lateral guide means for movably interconnecting the centrifugal bodies, wherein at each lateral end of a shoe, the guide means comprises a respective tangentially extending recess and projection, wherein in an assembled state of the clutch, each projection extends into a recess of an adjacent centrifugal body.

Thus, with the inventive centrifugal clutch, in order to provide a uniform transfer of torque, the lateral ends of the centrifugal bodies, via which in the assembled state of the clutch the centrifugal bodies rest against one another, are provided with guide means that prevent tilting of the centrifugal bodies relative to one another about the axis of rotation of the carrier member, or which compensate for such tilting. For this purpose, at each end of a centrifugal body the guide means comprises a projection, which is preferably integrally formed with the centrifugal body, and a recess that is formed in such end. The projection extends away from the respective end of the centrifugal body in a direction that is tangential to the drum. The projections and recesses, when viewed in a tangential direction, have no undercuts and are axially freely displaceable relative to one another. In the assembled state of rest of the centrifugal clutch, a slight axial and radial play is provided between a respective projection and recess. With the aid of the projections and recesses, the centrifugal bodies can be movably supported relative to one another in the radial direction of the centrifugal clutch. A respective projection and recess at one end of a centrifugal body are preferably disposed in such a way that the centrifugal bodies can thereby also be movably supported relative to one another in the axial direction.

For the automatic centering of the centrifugal bodies relative to one another, and for the jam-free radial displacement of the centrifugal bodies during operation of the centrifugal clutch, it is expedient to provide each projection with an inclined surface, whereby such inclined surface can be brought to rest against a complementary inclined surface on a respective recess. This effects a straightforward assembly of the centrifugal clutch. It is expedient to embody the inclined surfaces as flat surfaces that extend approximately parallel to the axis of rotation of the carrier member. It can also be expedient to respectively provide a plurality of projections and recesses at a given end of a centrifugal body. The inclined surfaces on the projections are preferably disposed in such a way that the projections taper conically toward the free end of a centrifugal body. Any tilting movements of a centrifugal body that might occur are transmitted by the positive engagement of the projections in the recesses to the respectively adjacent centrifugal body and are compensated for.

The recesses at a given end of a centrifugal body are embodied in such a way that they are open radially relative to the axis of rotation of the centrifugal clutch, and are embodied without undercuts, so that the projections that are guided into the recesses are movable out of the recesses in a radial direction relative to the axis of rotation of the clutch. In this way, the centrifugal bodies are held by the projections and recesses to be movable relative to one another such that under the effect of forces that act radially approximately in the direction of the centrifugal force (for example during the assembly of the centrifugal clutch), the centrifugal bodies can, if desired, be removed from one another and can be radially supported against one another by the projections and recesses counter to the direction of effect of centrifugal force.

For a simple assembly of the centrifugal clutch, and to make available a sufficiently great radial clearance of motion, it is expedient for the length of a respective projection to be approximately 1/10 of the arc length of a clutch shoe. The centrifugal bodies are interconnected by means of a respective spring element, preferably a tension spring, whereby the spring element extends approximately in a tangential direction relative to the clutch drum. The spring element or tension spring is, in this connection, disposed radially between the projections and recesses and the carrier member.

Further specific features of the present invention will be described in detail subsequently.

DESCRIPTION OF PREFERRED EMBODIMENTS

Referring now to the drawings in detail, the plan view of FIG. 1 schematically illustrates a centrifugal clutch 1 for a manually-guided implement, such as, by way of example, a power chain saw, a brush cutter, a trimmer, a drill, a cut-off machine, or the like. The centrifugal clutch 1 has a drive side 6 for the introduction of a drive torque from a drive shaft 25. The drive shaft 25 is driven by a drive motor, such as an internal combustion engine having reciprocating or rotary pistons, and in operation rotates the centrifugal clutch 1. On the drive side, the centrifugal clutch 1 is formed from three centrifugal bodies 2, 2', 2" that are each essentially formed from a clutch shoe 3 that has the shape of a circular arc and has a forked support member 4 that is integrally formed on the shoe 3. By means of the support member 4, each of the centrifugal bodies 2, 2', 2" is radially displaceably held and guided on a guide means 19 of a carrier wheel or member 5. The carrier member 5 is fixedly connected with the shaft 25 and during operation of the centrifugal clutch rotates about an axis of rotation 7. The centrifugal bodies 2, 2', 2" each have the same configuration and are disposed in a radially symmetrical manner relative to the axis of rotation 7 of the carrier member 5. The centrifugal bodies 2, 2', 2", especially with regard to their lateral ends 12, via which the centrifugal bodies respectively rest against one another, are configured in such a way that they can be installed into the centrifugal clutch 1, even individually rotated about a longitudinal axis 26 of a respective support arm 27 of the carrier member 5. A respective spring element 17, in the illustrated embodiment a tension spring 18, is tensioned between each end 12 of the centrifugal bodies 2, 2', 2". In this connection, the axial ends 28 of each tension spring engage in a respective eye 29 of the centrifugal bodies. For this purpose, the eyes 29 are disposed in the respective centrifugal body on both sides of the respective support member 4. In this connection, the tension springs 18 come to rest approximately in the tangential direction relative to a clutch drum 9 that is on the output side. When viewed in the radial direction of the centrifugal clutch 1, the tension springs 18 are disposed between the ends 12 and the carrier member 5.

The clutch drum 9 spans the centrifugal bodies 2, 2', 2", and in particular the shoes 3, both axially and with a radial spacing 30. The tension springs 18 effects a return or restoring force 10 upon the centrifugal bodies, which restoring force is directed radially relative to the axis of rotation 7. The centrifugal clutch 1 illustrated in FIG. 1 is shown in the state of rest, i.e. in a state as is established during idling of the internal combustion engine. In this connection, as shown in FIGS. 1–4, the centrifugal bodies are mutually supported against abutment surfaces 31 on their lateral ends 12. In this connection, the abutment surfaces 31 rest flat against one another. The abutment surfaces 31 are disposed in planes 32 that are directed radially relative to the axis of rotation 7, whereby the planes 31 linearly intersect in the axis of rotation 7.

At a speed of the drive shaft 25 that is greater than idling speed, the centrifugal bodies 2, 2', 2" move radially away from the axis of rotation 7 due to a centrifugal force 22 that acts upon the centrifugal bodies. As a result, the spacing 30 of the shoes 3 relative to the drum 9, and in particular to the surface 11 of the drum 9, is reduced and is ultimately eliminated. The shoes 3 reach the surface 11 in a frictionally engaging manner and transfer appropriate torque to the drum 9. The drum 9 accordingly represents the output side 8 of the centrifugal clutch 1. During operation of the centrifugal clutch, there results a clearance of motion of the centrifugal bodies relative to one another, whereby in order to avoid a bell-like noise, it is necessary that the shoes 3, over the entire speed range, in particular however during transition of the speed from idling into a load range, move exclusively radially against the surface 11 of the drum 9, i.e. without tilting or twisting relative to one another and with respect to the axis of rotation 7, and then come to rest radially against the surface 11 of the drum 9. This precludes a brief contact of the centrifugal bodies against the drum 9 due to tilting at low speeds.

In order to effect a mutual centering of the centrifugal bodies 2, 2', 2", i.e. to avoid a tilting of the centrifugal bodies about the axis of rotation 7, it is proposed pursuant to the present invention to provide a projection 14 and a recess 13 at each end 12 of a centrifugal body. In this connection, the projection 14 is preferably integrally formed with the respective centrifugal body, whereby the projection 14 and the recess 13 extend approximately in a tangential direction relative to the clutch drum 9. The configuration of a given projection 14 and recess 13 are embodied in a complementary manner relative to one another, so that, as shown in FIG. 1, the projection 14 at the end 12 of the centrifugal body 2 extends into the recess 13 at the facing end 12' of the centrifugal body 2' in the manner of a clearance fit. To avoid a twisting of the respective projection 14 in the recess 13 during assembly and during operation of the centrifugal clutch 1, it is expedient to embody the projection 14 in such a way that it tapers in a conical manner in a direction away from the centrifugal body. In the illustrated embodiment, this is achieved in that respective inclined surfaces 15 are provided on the projections 14, whereby an inclined surface 15 can slidingly rest against an inclined surface 20 of each recess 13. It is expedient to dispose a projection 14 and a recess 13 at an end 12 of a centrifugal body 2 such that at least a support of the centrifugal body in the radial direction relative to the axis of rotation 7 is effected. In the illustrated embodiment, this support function is effected in that a respective projection 14 and recess 13 are disposed next to one another in an axial direction 21 (see FIG. 4), preferably directly adjoining one another. In this connection, the inclined surfaces 15,20 are embodied as flat surfaces, and are disposed in a plane 33 (see FIG. 2) that extends parallel to the axis or rotation 7 of the carrier member 5.

Figure 2:
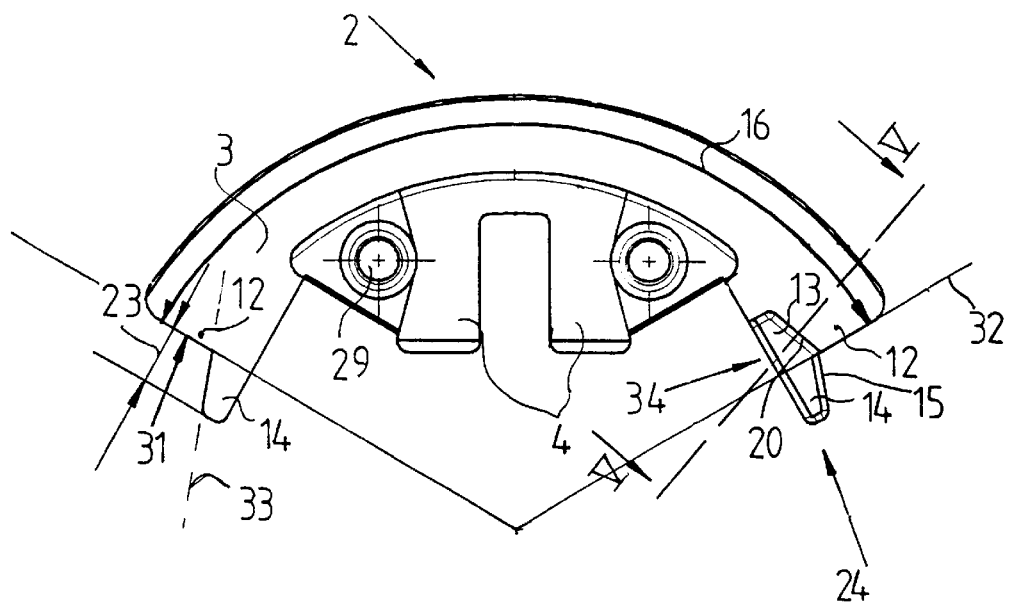
FIG. 2 is a plan view of one centrifugal body.

As shown in FIG. 2, in the individual centrifugal body 2 of FIG. 1, the recess 13 is embodied radially relative to the axis of rotation 7 with an open side 34. The projection 14 for the centrifugal bodies 2, 2' (see FIG. 1) can be introduced into the recess 13 from the open side 34. In this manner, a radial support of the centrifugal bodies relative to one another is effected from the radial direction on a side opposite from the axis of rotation 7. This precludes any possible twisting of the projections 14 in the recesses 13. The manufacture and assembly of the centrifugal bodies is simplified by these structural measures. The centrifugal bodies 2, 2', 2" are thereby supported relative to one another in such a way that if desired they can be removed from one another under the effect of radial forces that act approximately in the direction of the centrifugal force 22, and are supported relative to one another by the abutment surfaces 31 in a direction opposite to the direction of the centrifugal force 22. If during operation of the centrifugal clutch tendencies for the centrifugal bodies to undergo tilting movements about the axis of rotation 7 occur, these tendencies are dampened by the mutual engagement of the projections and the recesses, since a loose support connection of the centrifugal bodies relative to one another is effected.

Figure 3:
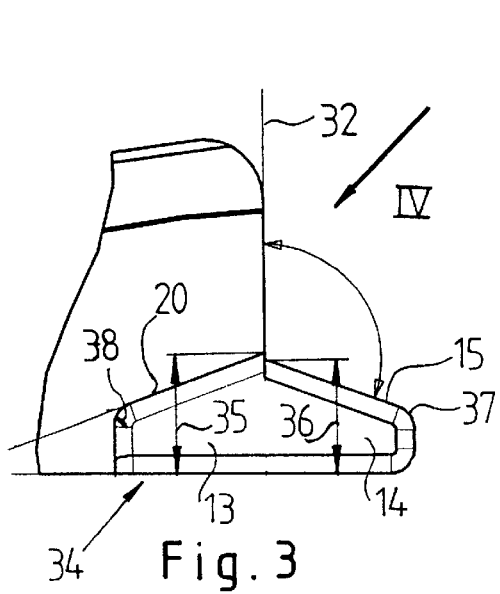
FIG. 3 is a view of one end of the centrifugal body of FIG. 2.

As shown in particular in FIG. 3, which is a partial view of the end 12 of the centrifugal body 2 of FIG. 2, the radial height 36 of the projection 14, as measured in the plane 32, is slightly less than the radial height 35 of the recess 13. As a consequence of these structural measures, there is effected a slight clearance fit of the respective inclined surfaces 15 and 20 in the joined-together state of the centrifugal bodies. As a result, in the state of rest or in a state where the centrifugal bodies do not tilt relative to the axis of rotation 7, the projections and recesses are not in contact with one another.

In order to avoid a twisting or a linear or point-type engagement of the projections 14 in the recesses 13, at least those edges or corners 37 of the projections 14 that extend in the axial direction 21, and the grooves 38 in the recesses 13, are rounded off.

Figure 4:
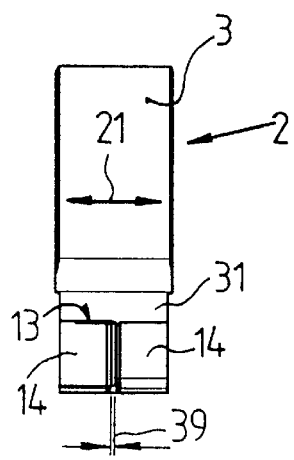
FIG. 4 is a plan view of the end of the centrifugal body taken in the direction of the arrow IV in FIG. 3.
Figure 5:
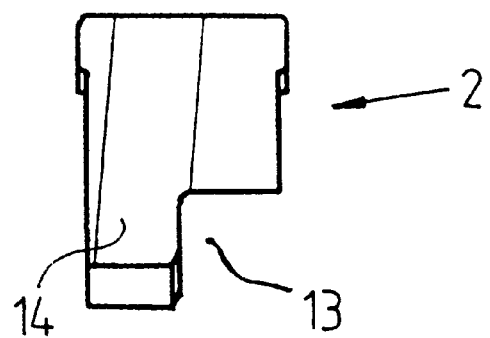
FIG. 5 is a cross-sectional view of the centrifugal body of FIG. 2 taken along the line V—V.

As can be seen in FIG. 4, which is a view of the centrifugal body in FIG. 3 taken in the direction of the arrow IV, the respective projections 14 of facing ends 12 of centrifugal bodies 2 produce a gap 39 in the axial direction 21. The projections 14 are disposed in the recesses 13 of adjacent centrifugal bodies accompanied by the formation of the gap 39.

In order to effect a sufficiently large support surface, in other words contact surface, between the inclined surfaces 15 and 20, it is expedient for the length 23 of a projection 14 to be such that this length 23 is approximately 1/10 of the arc length 16 of a respective clutch shoe 3.

The specification incorporates by reference the disclosure of German priority document 101 18225.2 filed Apr. 12, 2001.

The present invention is, of course, in no way restricted to the specific disclosure of the specification and drawings, but also encompasses any modifications within the scope of the appended claims.

I claim:

1. A centrifugal clutch, comprising:

a carrier member having an axis of rotation;

centrifugal bodies, each of which is a shoe that has the shape of a circular arcwith two lateral ends, and, on a drive side of said centrifugal clutch, is movably held on said carrier member via a support member;

a drum disposed on an output side of said centrifugal clutch coaxial to said axis of rotation of said carrier member, wherein said drum spans said shoes, and wherein during operation of said centrifugal clutch, under the effect of centrifugal force, said shoes are engageable against a surface of said drum counter to a restoring force; and lateral guide means for movably interconnecting said centrifugal bodies and comprising, at each of said lateral ends of said shoes, a respective tangentially extending recess and projection, wherein in an assembled state of said centrifugal clutch, each projection extends into a recess of an adjacent one of said centrifugal bodies, wherein said centrifugal bodies are movably supportable against one another in a radial direction by means of said projections and recesses, wherein said centrifugal bodies are movably supportable against one another in an axial direction by means of said projections and recesses, and wherein in a state of rest of said centrifugal clutch, said projections engage in said recesses with radial play and accompanied by the formation of an axial gap.

2. A centrifugal clutch according to claim 1, wherein each of said projections is integrally formed with its centrifugal body.

3. A centrifugal clutch according to claim 1, wherein said projections are provided with an inclined surface that is radially supportable against an inclined surface of said recesses.

4. A centrifugal clutch according to claim 3, said inclined surfaces are flat surfaces that extend approximately parallel to said axis of rotation of said carrier member.

5. A centrifugal clutch according to claim 1, wherein said projections and recesses at a given end of a shoe are disposed next to one another in an axial direction of said centrifugal clutch.

6. A centrifugal clutch according to claim 5, wherein said projections and recesses directly adjoin one another.

7. A centrifugal clutch according to claim 1, wherein said projections taper conically away from said centrifugal bodies.

8. A centrifugal clutch according to claim 1, wherein said centrifugal bodies are movably held relative to one another by said projections and recesses in such a way that under the effect of forces acting radially counter to centrifugal force, said centrifugal bodies are supported against one another by said projections and said recesses.

9. A centrifugal clutch according to claim 1, wherein a given projection has a length that is approximately 1/10 of an arc length of a given one of said shoes.

10. A centrifugal clutch according to claim 1, wherein said centrifugal bodies are interconnected by means of a spring element, which extends approximately in a tangential direction relative to said drum.

11. A centrifugal clutch according to claim 10, wherein said spring element is a tension spring.

12. A centrifugal clutch according to claim 11, wherein said tension spring is disposed in a radial direction between said projections and recesses and said carrier member.

13. A centrifugal clutch according to claim 1, wherein said carrier member is provided with guide means and wherein said centrifugal bodies are radially displaceably held on said guide means.

* * * * *